No. 870,394.

PATENTED NOV. 5, 1907.

C. TANGENBERG.
ARTIFICIAL VENEER.
APPLICATION FILED OCT. 22, 1906.

Christian Tangenberg,
INVENTOR.

WITNESSES:

By C. A. Snow & Co.
ATTORNEYS

UNITED STATES PATENT OFFICE.

CHRISTIAN TANGENBERG, OF CHICAGO, ILLINOIS.

ARTIFICIAL VENEER.

No. 870,394.   Specification of Letters Patent.   Patented Nov. 5, 1907.

Application filed October 22, 1906. Serial No. 340,047.

*To all whom it may concern:*

Be it known that I, CHRISTIAN TANGENBERG, a citizen of the United States, residing at Chicago, in the county of Cook and State of Illinois, have invented a new and useful Artificial Veneer, of which the following is a specification.

This invention relates to an artificial or transfer veneer, and has for its principal object to provide for the graining or marbleizing of surfaces of any kind at minimum expense.

In wood graining or marbleizing as ordinarily practiced, considerable time and highly skilled labor are essential, but in carrying out the present process the graining or marbleized effect is first made on a flexible sheet, and is transferred directly to the surface to which it is to be applied, the transfer work being quickly accomplished at trifling expense, while in the preparation of the veneer or transfer, machinery may be employed, so that the work will be of uniform quality and may be produced at very small cost.

Figure 1:
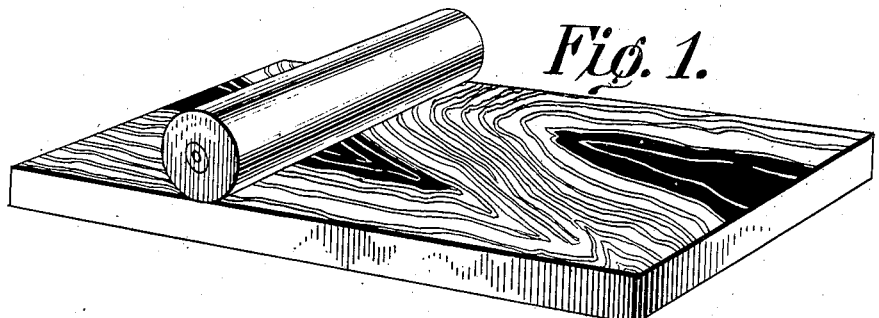
Figure 2:
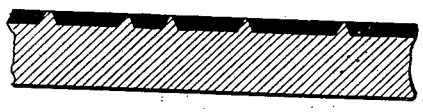
Figure 3:
Figure 4:
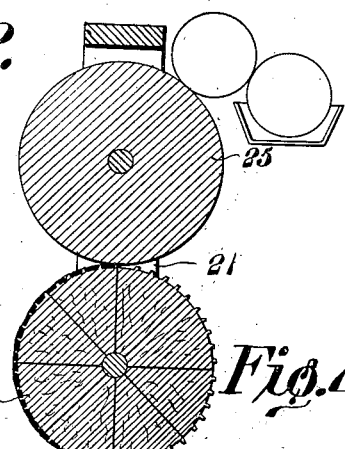
Figure 5:
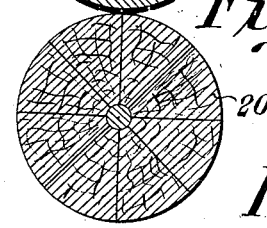
Figure 6:
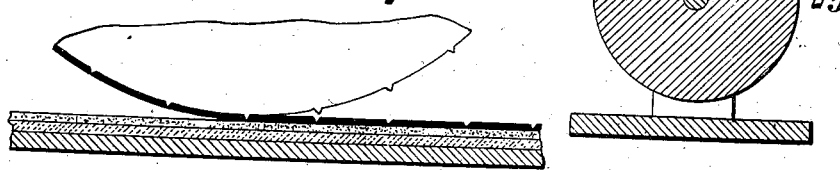

In the accompanying drawings:—Figure 1 is a perspective view showing a prepared board and a roller thereon for removing the filler applied to said board and transferring the grain design from the board to the roller; Fig. 2 is a cross section of a board showing the grain thereof and the filler applied thereto, on a greatly exaggerated scale; Fig. 3 is a cross section of the roller shown in Fig. 1 with the filler received from the board, and of another roller to which this filler is to be transferred, in operative relation to the first-named roller; Fig. 4 is a cross section of a machine for transferring a design in ink from the prepared roller to the prepared sheet, the view being partially diagrammatic; Fig. 5 is an enlarged view showing the manner of applying the design to the partially finished veneer; and Fig. 6 is an exaggerated section of a portion of the veneer ready to be applied to a board.

Similar numerals of reference are employed to indicate corresponding parts throughout the several figures of the drawings.

In making the veneer, a flexible foundation 10 is employed, the foundation being preferably in the form of a sheet of paper. This foundation is coated on one face with a layer 11 on which the veneer is built up, and this layer which forms a connection between the veneer proper and the foundation, is made of material which will permit the ready separation of the paper after the latter has been softened by moisture. The layer 11 is preferably formed of a mixture of one half glue and one half carrageen, (*Chondrus crispus*). After this layer, which may be called the releaser, has dried, there is applied to this releaser a coat of elastic varnish, and the latter is allowed to dry over a period of twenty-four hours, more or less. On this coat of elastic varnish an imitation of wood grain or marble is produced, and over this a coat of paint is applied, the latter serving the same purpose as the ground coat for ordinary graining or marbleizing by hand. In this coat of paint a slow drying oil is used to prevent the veneer from becoming brittle. Finally an additional coat, consisting of a solution of pipe clay and sugar of lead, is added. This latter layer serves two purposes, namely,—the pipe clay prevents the surface of the artificial veneer from adhering to any of the surfaces with which it may come into contact, so that it will permit of the rolling of the veneer in order that the same may be conveniently carried and handled. The sugar of lead will promote the drying of the veneer after it has been applied to any surface. On applying this artificial veneer, the surface to be treated is given a coat of varnish paint of a very adhesive nature. The latter is allowed to dry until it has a strong sticky surface. The artificial veneer is then placed over this surface and carefully rolled in order to drive out all the air bubbles between the veneer and surface. The paper is then thoroughly saturated with warm water and is removed. Where the veneer is made in large sheets, the sheets may be provided with small perforations to permit the more ready escape of the air.

In order to produce the wood graining or marbleizing effect by machinery, provision is made for securing a transfer from natural surfaces. To imitate oak graining or wood of any coarse grain, a board of the desired character is first planed and sandpapered, and then is coated with a dark filler. When this filler has partly dried, the surface is gone over with a leather or rubber scraper. Over this surface is then passed a roller made of glue, glycerin and molasses or other suitable material, and in passing this roller over the board, the filler which remains in the surface and slightly below the projecting portion of the grain which has been cleaned by the scraper, is taken up by the roller. This imitation is now transferred from the soft roller to a roller 20 that is made of close grained wood, such for instance as hard maple, gum or beech. This wooden roller is so constructed that the outside of the roller is of end wood, so that the roller cannot shrink more on one side than on the other, or become distorted. This roller is painted a light color, and is brought into contact with the soft impression roller, the two rollers being rotated and the filler being transferred from the soft roller to the light surface of the wooden roller. Having thus prepared the wooden roller, all of the surface of the latter that is coated by the transferred filler is cut away, leaving the grain alone to project, and this being end wood, will present sharp and durable edges. The paper having been prepared by the application of the releasing layer, and the coat of varnish 11, may be further provided with a transparent coat, such for instance as raw sienna or umber. The wooden grain roller is then mounted in a frame 21 at a point above a roller 23 that is provided with a covering of rubber or other yieldable material and above the wooden roller is arranged an inking roller 25 which may be formed of any suitable material that will carry the ink. This roller by coming into contact with the engraved roller will ink the latter and when the prepared paper is placed between the lower roller and the engraved roller, and the rollers are turned, an imitation will be transferred from the engraved roller to the varnish coat on the paper. After this coating is dried, a coat of paint is added, such, for instance, as a painter would apply to a surface as a ground work for graining, and after this the pipe clay and sugar of lead are added.

When an imitation of close grain wood is desired or an imitation of marble or other stone is to be made, the surface is treated with a destructive acid, which will eat away the softer parts, after which the filler is applied and the surface rubbed or cleaned to leave the grain exposed. The transfer is then made to the soft roller in the manner previously described.

The artificial veneer which forms the subject of the present invention may be applied to any surface and used for either outside or inside work, or for the finishing of articles of furniture. The graining being transferred from natural surfaces, is more attractive and uniform than it is possible for the most expert workman to accomplish by hand, while the cost of application is but a small fraction of the expense now incurred in graining or marbleizing.

I claim:—

1. An artificial transfer veneer comprising an absorbent base of yieldable or flexible material, a releasing layer thereon, an ornamental varnish layer on the releasing layer, a layer of paint on the varnish layer, and a final layer of non-fibrous, non-adhesive material on the layer of paint.

2. An artificial veneer comprising a flexible absorbent base, a releasing layer thereon, an ornamented layer of varnish or the like on the releasing layer, a layer of slow-drying paint on the ornamental layer of varnish, and a non-adhesive layer on the layer of paint.

3. An artificial veneer comprising a base of flexible material, a releasing layer thereon, a plurality of layers of paint or the like on the releasing layer, and a non-adhesive layer formed of pipe clay and sugar of lead arranged on top of the layer of paint.

4. An artificial veneer comprising a flexible absorbent base, a releasing layer thereon, an ornamented layer of varnish or the like on the releasing layer, a layer of slow-drying paint on the ornamented layer of varnish, and a non-fibrous, non-adhesive layer on the layer of paint.

5. An artificial veneer comprising a flexible absorbent base, a releasing layer thereon, an ornamented layer of varnish or the like on the releasing layer, a layer of slow-drying paint on the ornamented layer of varnish, and a non-fibrous, non-adhesive layer on the layer of paint acting as a drier for the slow-drying paint.

6. The herein described method of manufacturing artificial veneer, said method consisting in applying a soluble releasing layer to a flexible base, placing thereon a layer of varnish or the like, ornamenting said layer, covering the ornamental layer by a layer of paint, and finally applying a layer of non-fibrous non-adhesive material.

In testimony that I claim the foregoing as my own, I have hereto affixed my signature in the presence of two witnesses.

CHRISTIAN TANGENBERG.

Witnesses:
ELMER C. BYE,
N. P. NIELSEN.